O. L. COLVIN.
CORN KNIFE.
APPLICATION FILED DEC. 6, 1916.
1,217,154.
Patented Feb. 27, 1917.
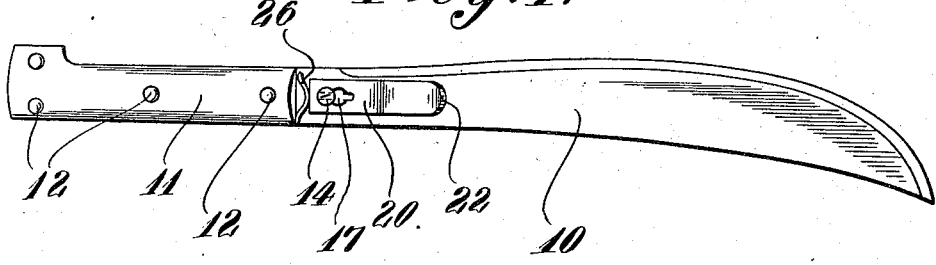
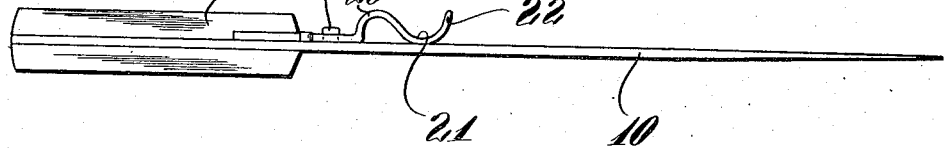
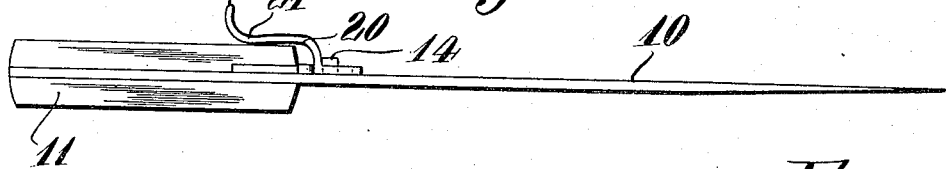
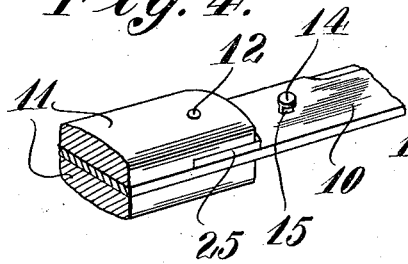
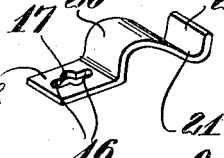
Inventor:
Orlando L. Colvin.
Oscar Geier
Atty

UNITED STATES PATENT OFFICE.

ORLANDO L. COLVIN, OF ZANESVILLE, OHIO.

CORN-KNIFE.

1,217,154.

Specification of Letters Patent. Patented Feb. 27, 1917.

Application filed December 6, 1916. Serial No. 135,349.

*To all whom it may concern:*

Be it known that I, ORLANDO L. COLVIN, a citizen of the United States, resident of Zanesville, county of Muskingum, and State of Ohio, have invented certain new and useful Improvements in Corn-Knives, of which the following is a specification.

This invention relates to improvements in cutting implements, and particularly with reference to such as are used in the harvesting of corn by severing the stalks close to the surface of the ground.

The principal object of the invention is to provide a cutter or knife to be used in one hand while the other hand grasps the stalks of the plants cut, so as to prevent their falling upon the ground.

Another object is to provide means, combined with the knife, whereby during the process of stacking the stalks, the knife may be supported in such manner as to avoid its dropping upon the ground and becoming dulled.

A further object is to provide a clip, secured to the knife, by which attachment may be made, the clip being rotatably engaged so as to present means preventing the operator's hand from slipping down upon the edge of the knife.

These and other similar objects are attained by the novel design and construction of parts hereafter described, and shown in the accompanying drawing, and in which:—

Figure 1 is a side elevational view of a cutter made in accordance with the invention.

Fig. 2 is an edge view of the same.

Fig. 3 is a similar edge view showing the clip turned oppositely from that shown in Fig. 2.

Fig. 4 is an enlarged fragmental perspective view showing the arrangement by which the clip may be secured to the knife blade.

Fig. 5 is a perspective view of the clip employed, and

Fig. 6 is a perspective view showing the means by which the clip may be held in either of its adjusted positions.

As will be evident from the drawings, the cutter consists of a relatively heavy blade 10 secured to the handle 11 by rivets 12 in the ordinary manner, the handle elements 11 being disposed upon either side as is usual.

At the upper part or hilt of the blade 10, and on one side thereof, is inserted a fixed stud 14, the head of which is preferably circular, the lower portion 15, next the blade, being recessed upon opposite sides so as to pass freely through the slots 16, extending from the central hole 17 formed in the clip 20, the openings being in a flange element 18 extending from the clip at one end, the other end 21 curving down until normal contact is made with the blade 10 and then turned outward reëntrantly as at 22, the clip being made of resilient material so that the end 22 may be sprung upward allowing the clip to pass over the surface of the belt or other attaching means worn by the operator.

In order to hold the clip extended in the position indicated in Fig. 2, a plate 25 is inserted in one of the handle elements adjacent to the blade, the plate having formed with it a spring element 26 adapted to exert pressure outwardly against the end of the clip plate 18, so that the clip is held in a relatively firm position.

When it is desired to remove the clip or to use it as a guard as shown in Fig. 3, the clip is grasped by the fingers, sufficient pressure being employed to overcome the tension of the spring 26, until the opening 17 is brought in register with the head 14 of the rivet, whereupon the clip may be removed or raised and rotated, so that the spring element 26 shall bear against the opposite end of the plate 18 holding it in the position shown in Fig. 3.

The movement of rotating the clip is performed very easily and expeditiously so that when the knife has been used in cutting the corn stalks or the like, when the clip is in the position shown in Fig. 3, the clip is reversed and attached to the belt of the operator in an obvious manner.

Having thus described my invention, what I claim as new, and desire to secure by Letters Patent, is:—

1. In a knife, the combination with a blade and handle thereof, of a stud affixed in said blade adjacent to said handle, said stud having flat sides below its head, a clip having an opening engageable with said stud, and recesses extending longitudinally therefrom, a spring in said handle adapted to press said clip outwardly, and means whereby said clip may be reversed.

2. In a knife of the class described, the combination with a flat blade and handle elements attached upon either side thereof at one end, of a stud fixed in said blade, said projection having flattened sides and a round end, a spring clip having a plate portion engageable with said stud, a spring element engaged with said handle adapted to press against said clip, and means permitting said clip to be rotated.

In testimony whereof I have affixed my signature this 2″ day of December, 1916.

ORLANDO L. COLVIN.

Copies of this patent may be obtained for five cents each, by addressing the "Commissioner of Patents, Washington, D. C."